(12) United States Patent
Froeberg

(10) Patent No.: US 6,233,517 B1
(45) Date of Patent: May 15, 2001

(54) PREDICTIVE MODEL FOR AUTOMATED VEHICLE RECOMMENDATION SYSTEM

(75) Inventor: Peter L. Froeberg, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/136,208

(22) Filed: Aug. 18, 1998

Related U.S. Application Data

(63) Continuation-in-part of application No. 08/607,468, filed on Feb. 27, 1996, now Pat. No. 5,812,959.

(51) Int. Cl.$^7$ .............................. G06F 19/00; G06G 7/70
(52) U.S. Cl. .................. 701/117; 701/200; 701/208; 701/214; 340/990; 340/988; 340/907
(58) Field of Search .................................... 701/117, 208, 701/214, 200, 204, 300, 302; 340/907, 988, 989, 990

(56) References Cited

U.S. PATENT DOCUMENTS

| | | | |
|---|---|---|---|
| 3,694,579 | * 9/1972 | McMurray | 379/49 |
| 3,886,553 | * 5/1975 | Bates | 342/465 |
| 4,494,119 | * 1/1985 | Wimbush | 342/457 |
| 5,055,851 | * 10/1991 | Sheffer | 342/457 |
| 5,122,959 | * 6/1992 | Nathanson | 701/117 |
| 5,218,367 | * 6/1993 | Sheffer et al. | 342/457 |
| 5,272,638 | * 12/1993 | Martin et al. | 455/456 |
| 5,363,306 | * 11/1994 | Kuwahara et al. | 701/208 |
| 5,523,950 | * 6/1996 | Peterson | 455/456 |
| 5,559,520 | * 9/1996 | Barzegar et al. | 342/357.1 |
| 5,812,959 | * 9/1998 | Froeburg et al. | 701/117 |
| 5,821,878 | * 10/1998 | Raswant | 340/907 |
| 5,986,583 | * 11/1999 | Nakano et al. | 340/988 |
| 6,014,081 | * 1/2000 | Kojima et al. | 340/576 |

\* cited by examiner

*Primary Examiner*—William A. Cuchlinski, Jr.
*Assistant Examiner*—Olga Hernandez
(74) *Attorney, Agent, or Firm*—Wagner, Murabito & Hao LLP

(57) ABSTRACT

A system and method for determining which of a plurality of vehicles is able to respond most quickly to an event. In one embodiment, the present invention divides a geographic region into a plurality of geographic cells. The present automatic vehicle recommendation system then calculates a response time for each of the plurality of vehicles to travel from each of the geographic cells to every other of the geographic cells. The position of each of the plurality of vehicles is monitored by an automatic vehicle location (AVL) system. The present automatic vehicle recommendation system then determines which of the plurality of vehicles is able to respond most quickly to an event reported to a computer aided dispatch (CAD) system. The event is located within one of the geographic cells. The present invention then communicates to the CAD system which of the plurality of vehicles is able to respond most quickly to the reported event. Thus, the present invention provides a system which automatically recommends which of a plurality of vehicles can respond most quickly to an event, a system which can function in conjunction with an existing AVL or CAD system, and a system which reduces CAD system operator decision making processes.

17 Claims, 11 Drawing Sheets

|     | 86  | 88  | 90  | 92  | 94  | 96  | 98  | 100 |
|-----|-----|-----|-----|-----|-----|-----|-----|-----|
| 86  | 2.6 | 1.9 | 2.8 | 4.8 | 1.0 | 2.6 | 3.1 | 6.0 |
| 88  | 1.9 | 2.1 | 2.0 | 4.0 | 1.1 | 1.1 | 1.7 | 5.0 |
| 90  | 2.8 | 2.0 | 1.9 | 1.1 | 2.8 | 1.0 | 1.8 | 3.0 |
| 92  | 4.8 | 4.0 | 1.1 | 2.2 | 3.0 | 4.9 | 1.4 | 2.0 |
| 94  | 1.0 | 1.1 | 2.8 | 3.0 | 2.0 | .90 | 2.5 | 5.5 |
| 96  | 2.6 | 1.1 | 1.0 | 4.9 | .90 | 1.5 | 1.1 | 3.0 |
| 98  | 3.1 | 1.7 | 1.8 | 1.4 | 2.5 | 1.1 | 2.0 | 2.1 |
| 100 | 6.0 | 5.0 | 3.0 | 2.0 | 5.5 | 3.0 | 2.1 | 3.0 |

FIG. 7

PREDICTIVE MODEL FOR AUTOMATED VEHICLE RECOMMENDATION SYSTEM

This application is a continuation-in-part of and claims the benefit of U.S. patent application Ser. No. 08/607,468 filed Feb. 27, 1996, issued as U.S. Pat. No. 5,812,959 dated Sep. 22, 1998.

TECHNICAL FIELD

This invention relates to vehicle tracking and automatic vehicle location systems. Specifically, the present invention relates to computer-aided dispatch systems.

BACKGROUND ART

Vehicle tracking using an automatic vehicle location (AVL) system is well known in the art. In a typical AVL system, each of a plurality of vehicles communicates its position to a base station. The position of each of the vehicles is commonly superimposed over a simplified map to provide a graphical display of the position of the vehicles with respect to the underlying simplified map. An AVL system can also be used to dramatically enhance the function of a computer aided dispatch (CAD) system.

In one use of a CAD system, a system operator dispatches emergency vehicles to a reported event. For example, a 911 operator using a CAD system receives a phone call reporting a medical emergency. The CAD operator automatically receives information indicating the geographic position of the caller. (Often the event reported by the caller occurs nearby the location from which the caller is calling.) The geographic position of the caller is obtained, for example, by an automatic number identification/automatic location identification (ANI/ALI) system used in conjunction with a geo-file. By accessing an AVL system, the CAD operator is able to visually determine which of the displayed vehicles is positioned near or nearest to the location of the caller. However, an AVL system does not necessarily indicate which of the vehicles can respond most quickly to the location of the event reported by the caller. That is, although a first vehicle may appear to be physically closer than a second vehicle to the location of the event, a vehicle impeding barrier may exist between the first vehicle and the location of the reported event. The vehicle impeding barrier can be, for example, a building, a river, a one way street, and the like. Thus, even though the first vehicle appears to the CAD operator to be closer to the reported event, the second vehicle is able to more quickly respond to the event. Therefore, although an AVL system can enhance the functionality of a CAD system, an AVL system can not reliably determine which of a plurality of vehicles can respond most quickly to an event. The shortcomings of a combined AVL and CAD system are especially prevalent in an environment containing complex geographic features. Such environments include, for example, large metropolitan areas such as San Francisco, New York, Los Angeles, Boston, and the like.

As an additional drawback, prior art CAD systems or combined AVL and CAD systems require the CAD operator to decide which of a plurality of available vehicles can respond most quickly to a reported event. That is, even when the CAD operator is aware of vehicle impeding barriers, the CAD operator must consider the barriers when determining which vehicle to dispatch to the event. Furthermore, often the CAD system operator must choose which vehicle to dispatch while under the extreme pressure associated with handling life threatening events commonly reported to CAD system operators. As a result, CAD system operators may make errors even when the operators are aware of geographic and or vehicle impeding barriers present at or near the reported event. To make matters even worse for CAD system or combined AVL and CAD system operators, dispatch decisions must be made under rigorous time constraints. Hence, even well trained CAD operators may mistakenly dispatch the wrong vehicle or a slower responding vehicle to a reported event.

An automatic vehicle recommendation (AVR) system which swiftly and automatically recommends which of a plurality of vehicles can respond most quickly to an event has been developed and previously disclosed. The AVR system can function in conjunction with an existing AVL or CAD system, and reduces CAD system operator decision making processes.

A potential drawback to an AVR system is the inability to accurately locate the plurality of vehicles within the visual display of the AVR system. That is, there is a resolution associated with the visual display. The smallest resolved component of the visual display may actually encompass a relatively large geographic area, such as a city block or perhaps larger. within that resolution, a vehicle would appear to be in the center of a geographic area, where in reality it may be up against one boundary of the geographic area. Thus, the vehicle may actually have to traverse the width of the geographic area in response to an emergency call, adding to its response time. This additional time would not be recognized by an AVR system or its operator unless the location of the vehicle can be more precisely located. Hence, the AVR system may recommend and/or the operator may select a slower responding vehicle.

Another potential drawback to an AVR system pertains to the methodology employed to generate predicted response times from one geographic position to another. A methodology that uses the crow flies distance provides a reasonable far field approximation for computing response times to distant locations, but inherently includes large uncertainties because it doesn't account for vehicle impeding boundaries or the actual distance to be traveled. Other methods can be used to provide a more accurate prediction, but these methods also can introduce large and unsatisfactory uncertainties into the AVR system.

Finally, there are potential drawbacks associated with the database of predicted vehicle response times. The database would need to be very large if a predicted response time is generated for every possible combination of travel routes from one geographic region to another. Therefore, it may not be practical to provide a predicted response time for every combination. However, a combination that is not considered may turn out to be eventually needed. Hence, the AVR system would not be able to model that combination and thus may recommend one vehicle when in actuality another vehicle is better able to respond. In addition, as described above, the predicted response times may incorporate uncertainties, either because of the methodology employed to make the prediction, or because of factors not recognized during the calculation. Without recognition of how the predicted response time compares to the actual time it takes to respond, the AVR system may not provide the proper recommendation.

Thus, a need exists for an AVR system which can accurately and automatically position vehicles within the monitored geographic region. Such an AVR system should be able to predict with reasonable accuracy the response time for each of a plurality of vehicles for all potential dispatch destinations. Also, such a system should ideally become more accurate through use.

DISCLOSURE OF THE INVENTION

The present invention provides an AVR system accurately and automatically position vehicles within the monitored geographic region. The present invention further provides an AVR system which predicts with reasonable accuracy the response time for each of a plurality of vehicles for all potential dispatch destinations. Also, the present invention provides a system which becomes more accurate through use.

Specifically, in one embodiment, the present invention divides a geographic region into a plurality of geographic cells. The present automatic vehicle recommendation system then calculates a response time for each of the plurality of vehicles to travel from each of the geographic cells to every other of the geographic cells. The position of each of the plurality of vehicles is monitored by an automatic vehicle location (AVL) system. The present automatic vehicle recommendation system then determines which of the plurality of vehicles is able to respond most quickly to an event reported to a computer aided dispatch (CAD) system. The event is located within one of the geographic cells. The present invention then communicates to the CAD system which of the plurality of vehicles is able to respond most quickly to the reported event. Thus, the present invention provides a system which automatically recommends which of a plurality of vehicles can respond most quickly to an event, a system which can function in conjunction with an existing AVL or CAD system, and a system which reduces CAD system operator decision making processes.

In another embodiment of the present invention, the steps listed above in conjunction with the previous embodiment are again performed. In the present embodiment, however, the geographic cells are formed in the following manner. A plurality of first geographic cells are partitioned from the geographic region along jurisdictional boundaries. The plurality of first geographic cells are then divided along any hydrographic features existing therein into a plurality of second geographic cells, wherein the plurality of second geographic cells are smaller than the plurality of first geographic cells. Next, the plurality of second geographic cells are divided along railway lines disposed therein into a plurality of third geographic cells, wherein the plurality of third geographic cells are smaller than the plurality of second geographic cells. In a similar manner, the plurality of third geographic cells are then divided along selected boundaries into a plurality of fourth geographic cells, wherein the plurality of fourth geographic cells are smaller than the plurality of third geographic cells. The division process continues along selected boundaries until geographic cells of a desired size are attained.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7 is a vehicle response time matrix formed by a vehicle response time matrix compiler of an automatic vehicle recommendation (AVR) system in accordance with the present claimed invention.

BEST MODE FOR CARRYING OUT THE INVENTION

Figure 1:
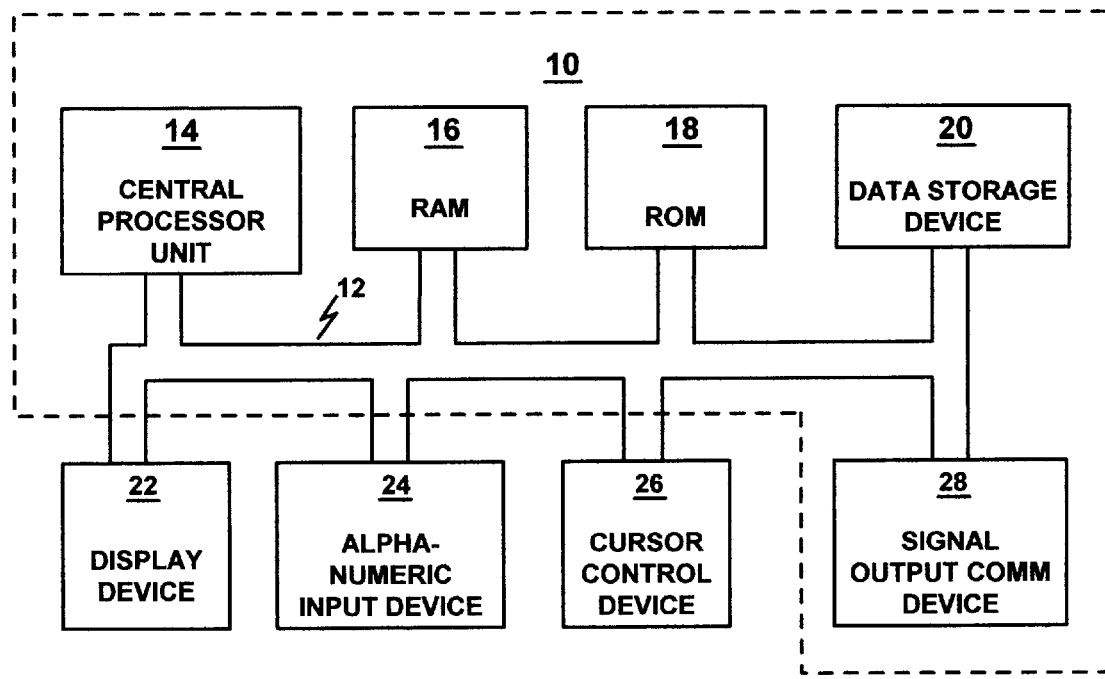
FIG. 1 is a schematic diagram of an exemplary computer system used as a part of a computer aided dispatch (CAD) system in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits,.values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "computing", "estimating", "calculating", "determining", "displaying" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

With reference now to FIG. 1, portions of the present automatic vehicle recommendation system are comprised of computer executable instructions which reside in a computer system. FIG. 1 illustrates an exemplary computer system 10 used as a part of a computer aided dispatch (CAD) system in accordance with the present invention. In the present embodiment, CAD system 10 has AVL capabilities. The AVL portion of CAD system 10 allows CAD system 10 to track and monitor the position of vehicles which may be dispatched. It is appreciated that the CAD system 10 of FIG. 1 is exemplary only and that the present invention can operate within a number of different computer systems other than CAD systems including general purpose computers systems, embedded computer systems, and stand alone computer systems specially adapted for automatically recommending vehicles.

CAD system 10 of FIG. 1 includes an address/data bus 12 for communicating information, a central processor unit 14 coupled to bus 12 for processing information and instructions. CAD system 10 also includes data storage features such as a random access memory 16 coupled to bus 12 for storing information and instructions for central processor unit 14, a read only memory 18 coupled to bus 12 for storing static information and instructions for the central processor unit 14, and a data storage device 20 (e.g., a magnetic or optical disk and disk drive) coupled to bus 12 for storing information and instructions. CAD system 10 of the present embodiment also includes a display device 22 coupled to bus 12 for displaying information (e.g., a list of recommended vehicles) to a CAD operator. An alphanumeric input device 24 including alphanumeric and function keys is coupled to bus 12 for communicating information and command selections to central processor unit 14. CAD system 10 also includes a cursor control device 26 coupled to bus 12 for communicating user input information and command selections to central processor unit 14, and a signal input output comm device 28 (e.g. a modem) coupled to bus 12 for communicating command selections to central processor unit 14.

Display device 22 of FIG. 1, utilized with CAD system 10 of the present invention, may be a liquid crystal device, cathode ray tube, or other display device suitable for creating graphic images and alphanumeric characters recognizable to the user. Cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands.

Figure 2:
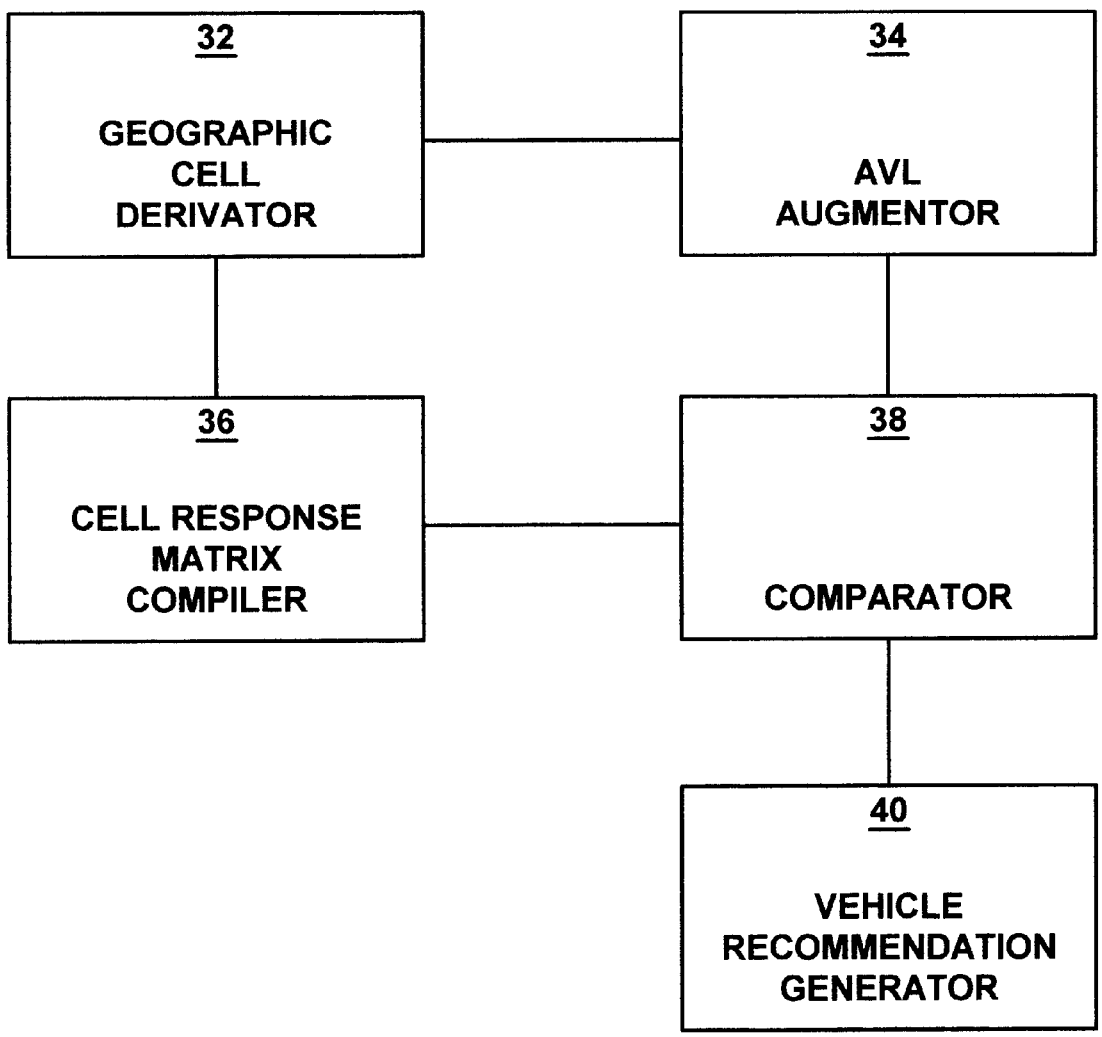
FIG. 2 is a logical representation of components of one embodiment of an automatic vehicle recommendation system in accordance with the present claimed invention.

FIG. 2 is a logical representation of components of one embodiment of the present automatic vehicle recommendation system. These components of FIG. 2 include a geographic cell derivator 32, an AVL augmentor 34, vehicle response time matrix compiler 36, a comparator 38, and a vehicle recommendation generator 40. In the present embodiment, geographic cell derivator 32, AVL augmentor 34, vehicle response time matrix compiler 36, comparator 38, and vehicle recommendation generator 40 are implemented as executable instructions within CAD system 10 of FIG. 1. A more detailed discussion of the components of the present invention and the steps performed by the components is found below.

GENERAL DESCRIPTION OF TRAJECTORY DETERMINING PROCESS OF THE PRESENT INVENTION

Figure 3:
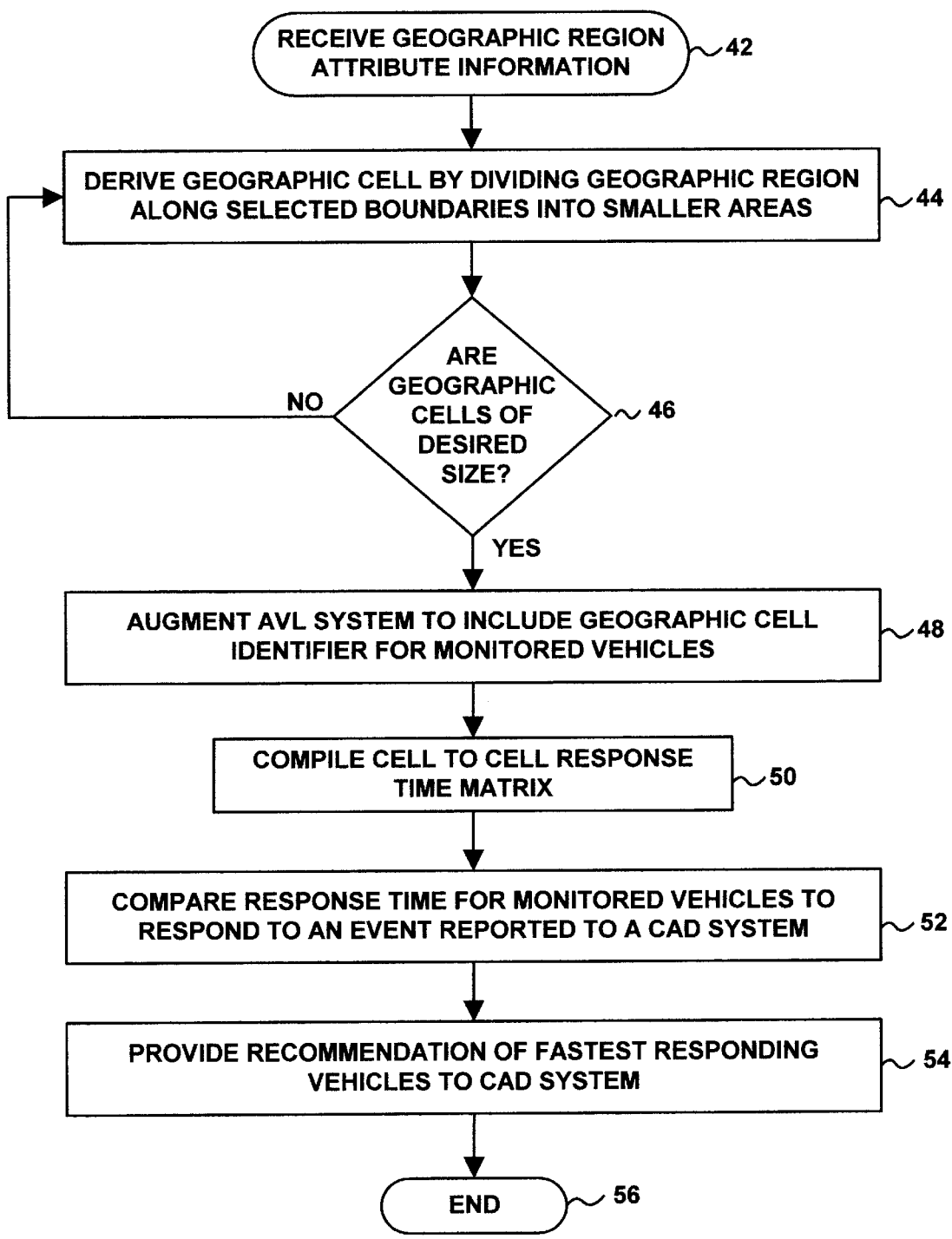
FIG. 3 is a flow chart illustrating steps employed by the automatic vehicle recommendation (AVR) system in accordance with the present claimed invention.

With reference next to FIG. 3, a flow chart illustrating steps employed by the automatic vehicle recommendation (AVR) process of the present invention is shown. During use of the present invention, an event such as, for example, a medical emergency is reported to an operator of a CAD system. The CAD system operator activates the present AVR invention by, for example, pushing an "AVR" marked button. The present AVR invention then recommends to the CAD system operator, which of a plurality of monitored vehicles is able to respond most quickly to the location of the reported event. The automatic vehicle recommending system of the present invention is described in detail below. In step 42, the present AVR system receives geographic region attribute information to be analyzed by the present AVR system. The geographic attribute information includes such items as, for example, vector street map information, jurisdictional areas and boundaries, hydrographic features, railways, callbox locations and the like. Although vector street map information, jurisdictional areas and boundaries, hydrographic features, railways, and callbox locations are specifically recited in the present embodiment, the present invention is also well suited to using numerous other types of vehicle impeding boundaries in the geographic cell derivation process of the present invention. The geographic cell derivation process recited in step 44 of the present invention will be discussed after the above-listed types of geographic attribute information received in step 42 have been examined.

Vector street map information, also referred to as the transportation layer, may include, for example, the physical layout of roadways within the geographic region of interest, the type of roadways present, the allowed direction of traffic flow on the roadways, the location of intersections, speed limits for the various roadways, and the like. The vector street map information is essential to the step of deriving geographic cells as recited in the present invention. The transportation network can also provide the means for computing an initial travel cost or vehicle response time matrix. In the present automatic vehicle recommendation system, the vector street map information may be either a proprietary data set developed by a local agency or one purchased commercially.

Jurisdictional areas and boundaries are often considered during the geographic cell derivation process of the present invention. Typical jurisdictional areas include police beats, fire still areas, dispatch regions, and the like. One reason jurisdictional areas and boundaries are significant in the geographic cell derivation process is because they often provide a convenient starting point for the derivation process. That is, a large geographic region can be initially partitioned into a first set of geographic cells simply by dividing the geographic region along jurisdictional boundaries. A second reason jurisdictional areas and boundaries are significant in the geographic cell derivation process is because the geographic cells formed by dividing the geographic region along jurisdictional boundaries are well suited to being used with a currently existing dispatch process.

Hydrographic features include bodies of water, streams, rivers, and the like. These features play a significant role in deriving geographic cells. A river is perhaps the most obvious example of a natural vehicle impeding barrier. The extent that these features influence geographic cell derivation in the present AVR system will, of course, vary from region to region. For example, hydrographic features are much more of a factor in San Francisco, Boston and Chicago than Los Angeles. If commercial vector street map information is being used, hydrographic features may be included therein. If hydrographic features are not included in the vector street map information, hydrographic feature information is obtained separately.

Railways are also an important factor in the geographic cells derivation process of the present invention. Because railroads often can only be crossed at specific places, i.e. railway crossings, railways provide significant vehicle impedance. Thus, railways are considered during the geographic cell derivation process of the present invention. Like hydrographic features, railway features are typically included in commercial vector street map databases but, if necessary, railway feature information may be obtained from other sources.

Callboxes are often the most valuable source used in the geographic cell derivation process of the present invention. In the past, before the advent of widespread residential telephone use, a callbox would be located, for example, at the corner of a residential block. If one of the homes in the residential block were to catch fire, a neighborhood inhabitant would activate the callbox. The fire department would then respond to the neighborhood represented by the activated callbox. Today, each callbox commonly represents a surrogate address family to be used as a key for fire engine or ambulance response scenarios. Most often the callboxes do not physically exist on the street. Instead, the physical callboxes have long since been removed but the notion of a callbox and its former location are still used for jurisdictional or dispatch purposes. Similarly, as a city grows, new callbox addresses may be created without ever erecting a callbox at the new address. Extensive callbox systems often exist in larger and older cities. In such cities, callboxes provide a complete and evenly distributed pattern throughout the city. As a further benefit, callboxes tend to be aligned along natural and man-made barriers such as rivers, highways, tunnels, railroads, and the like. Additionally, many current CAD systems are based on callbox-type dispatch scenarios.

With reference still to step 42, in the present invention, the geographic region attribute information is incorporated into a geographic information systems (GIS) database. In the present embodiment, the geographic region attribute information is incorporated into an ARC/INFO GIS database manufactured by Environmental Systems Research Institute (ESRI) of Redlands, Calif.

With reference next to step 44, after the geographic region attribute information has been received, the present invention derives geographic cells by dividing the geographic region into smaller areas. The present invention divides the geographic region along selected boundaries associated with the geographic region attribute information.

With reference next to FIG. 4A–D, an example of the geographic cell derivation process recited in step 44 is shown. Geographic cell derivator 32 of FIG. 2, utilizes the geographic region attribute information to partition geographic region along jurisdictional boundaries 62a and 62b into smaller geographic cells 64, 66, and 68. It will be understood that the exact partitioning of geographic region 60 will be based upon the location and arrangement of the jurisdictional boundaries. Furthermore, the entire partitioning process will vary for each geographic region based upon the location and arrangement of all various boundaries considered during geographic cell derivation process 44.

Figure 4A:
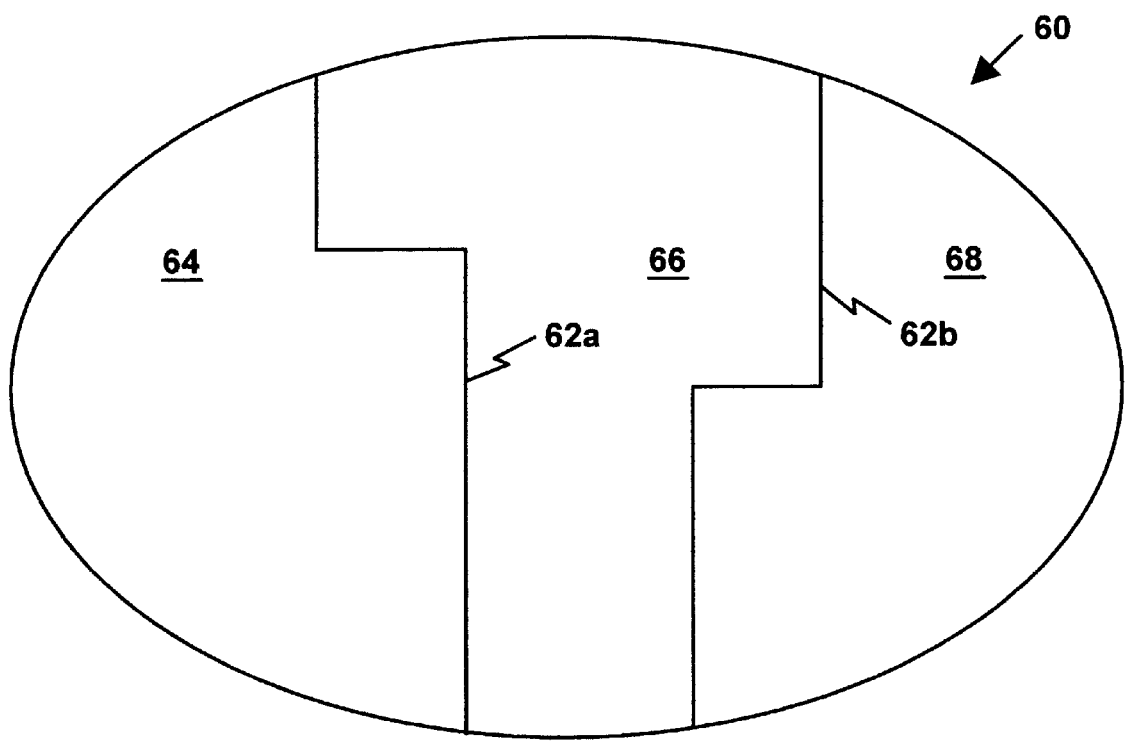
FIGS. 4A–D are schematic diagrams illustrating a geographic cell derivation process employed by an automatic vehicle recommendation (AVR) system in accordance with the present claimed invention.
Figure 4B:
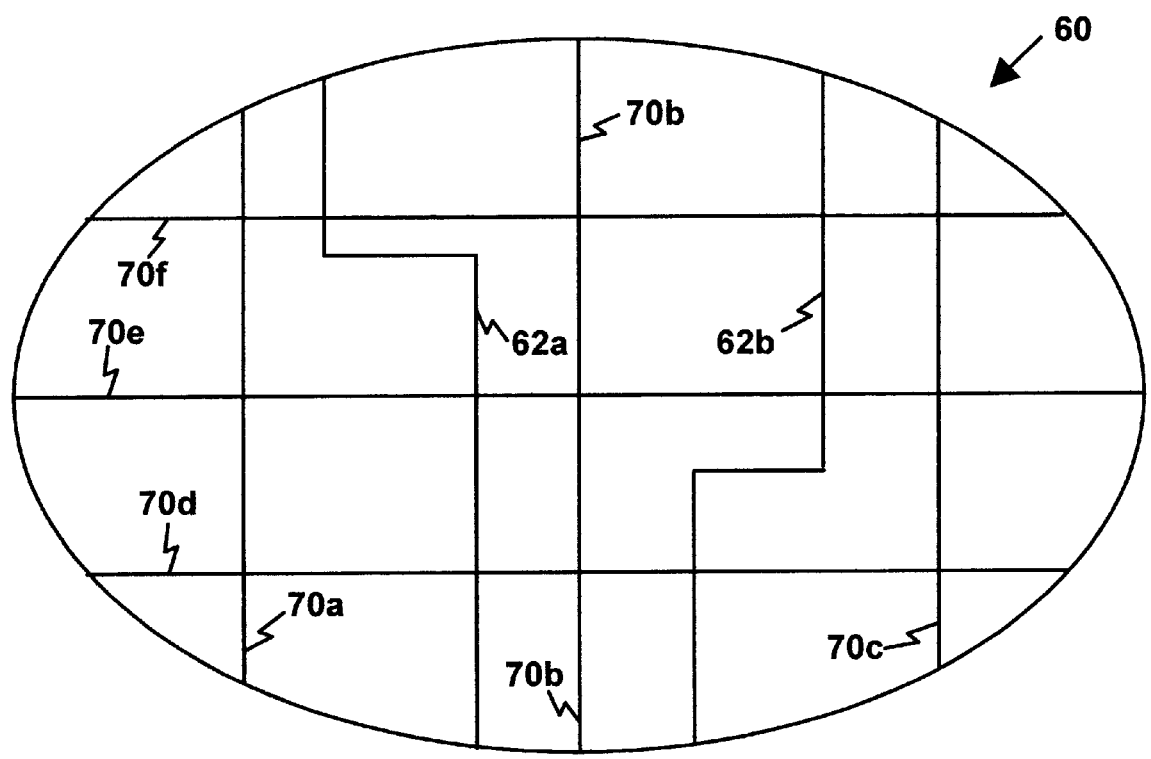

With reference next to FIG. 4B, in the present embodiment geographic region 60 is then partitioned by geographic cell derivator 32 along boundaries 70a–70f associated with the vector street map information. After partitioning geographic region 60 along boundaries 70a–70f, 24 smaller geographic cells are formed.

Figure 4C:
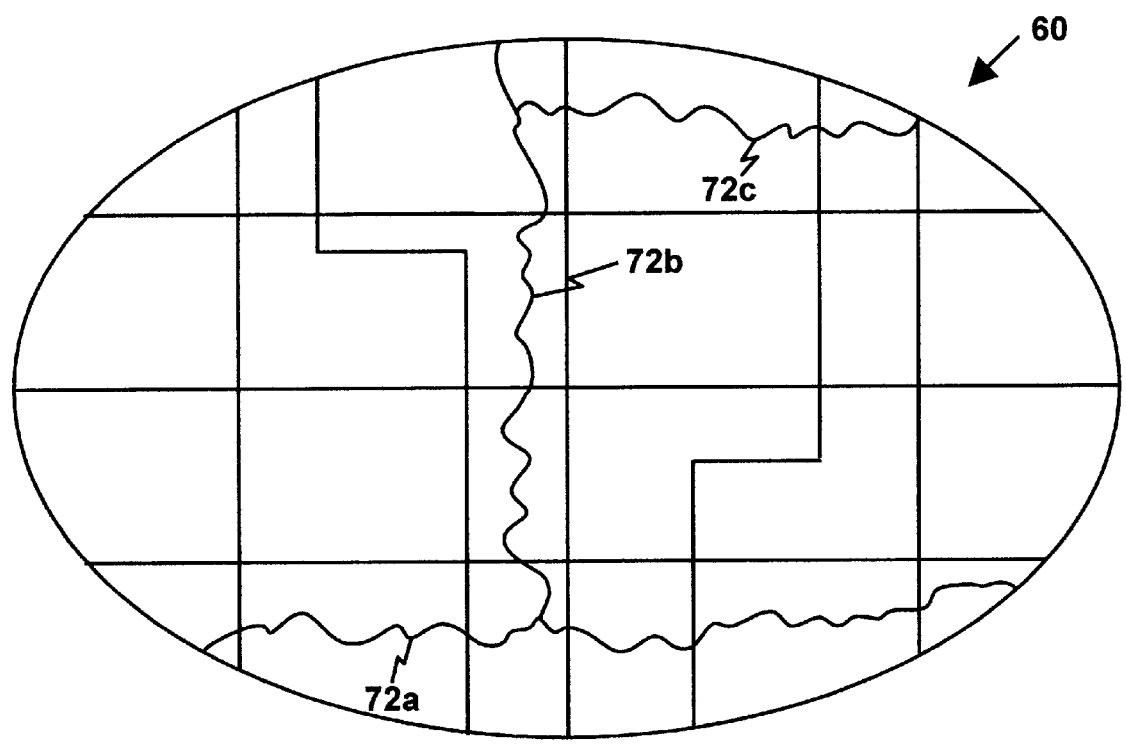

As shown in FIG. 4C, in the present embodiment geographic cell derivator 32 continues the geographic cell derivation process of step 44 by further partitioning geographic region 60 along hydrographic feature related boundaries 72a–72c. 37 smaller geographic cells are derived by partitioning geographic region 60 along boundaries 72a–72c and previously described boundaries 62a, 62b, and 70a–70f.

Figure 4D:
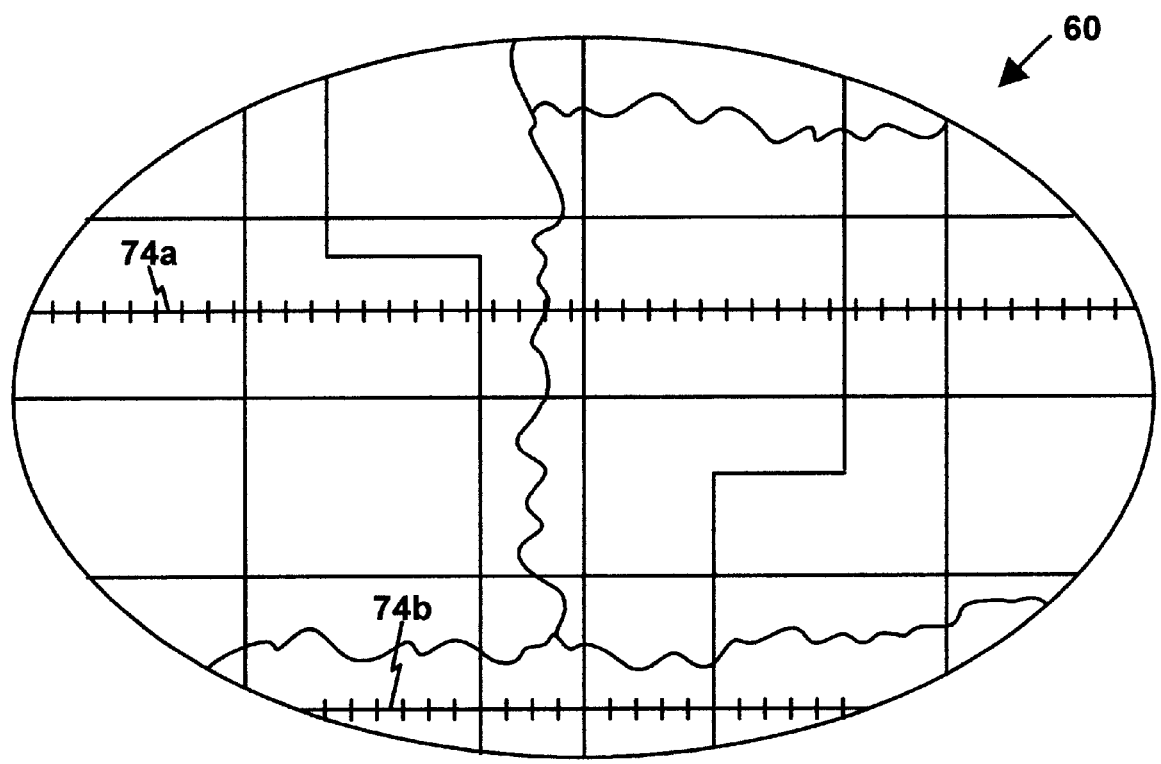

Referring now to FIG. 4D, in the present embodiment geographic cell derivator 32 continues the geographic cell derivation process of step 44 by further partitioning geographic region 60 along railway related boundaries 74a and 74b. 50 smaller geographic cells are derived by partitioning geographic region 60 along boundaries 74a and 74b and previously described boundaries 62a, 62b, 70a–70f, and 72a–72c. Although geographic region 60 is partitioned as described above in the present embodiment, the present invention is also well suited to deriving geographic cells from geographic region 60 using other vehicle impeding boundaries or features, by using fewer or greater boundaries, or by using any combination of the above-mentioned boundaries and features.

Figure 5:
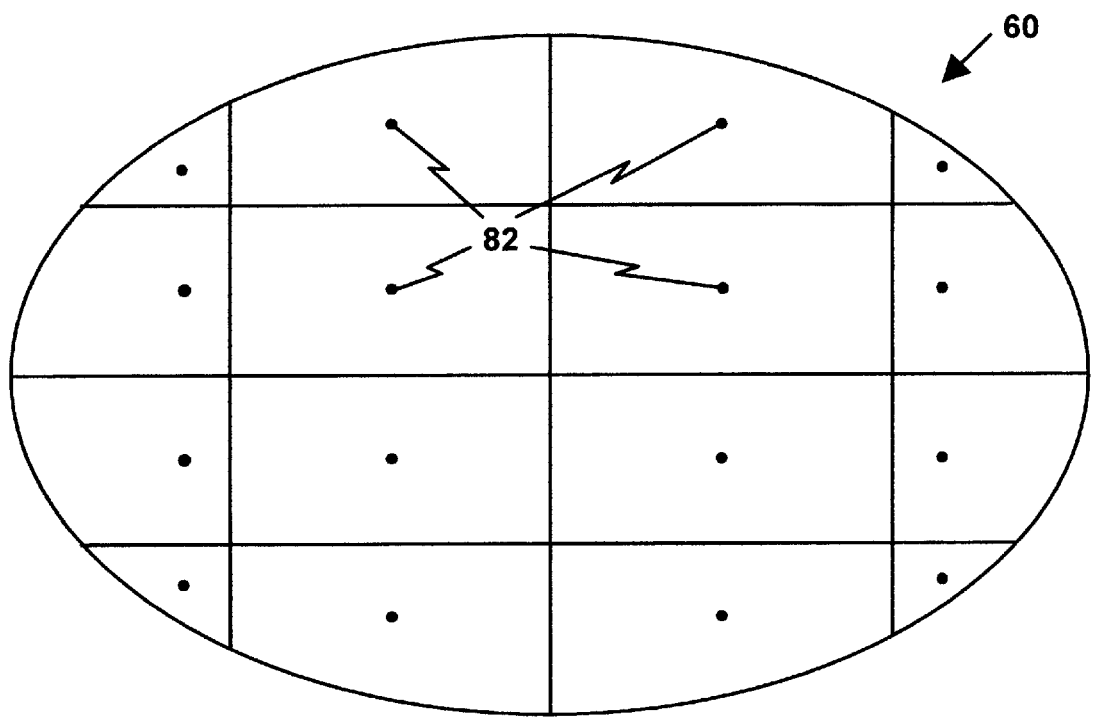
FIG. 5 is a schematic diagram illustrating another geographic cell derivation process employed by an automatic vehicle recommendation (AVR) system in accordance with the present claimed invention.

With reference now to FIG. 5, a schematic diagram of a geographic region 60 containing numerous callboxes, typically referenced as 82, is shown. In geographic region 60, geographic cells can be derived by partitioning geographic region 60 around callboxes 82. That is, each call box acts as a center or nucleus for a geographic cell. As shown in FIG. 5, geographic region 60 is completely and substantially equally partitioned along using callboxes 82. In an instance where the callboxes are not completely or uniformly spread throughout the geographic region, cell derivation process occurs using the available callboxes in combination with vector street map information, jurisdictional areas and boundaries, hydrographic features, railways, and the like. Thus, callboxes provide yet another means for deriving geographic cells from a geographic region.

With reference now to step 46 of FIG. 3, the present invention determines whether the geographic cells are of a desired size. In the present embodiment, the geographic cell derivation process of step 44 continues until the center of each geographic cell is approximately one-third to one-fourth of a mile from the center of the nearest geographic cell. Although such a geographic cell size is specified in the present embodiment, the present invention is also well suited to deriving geographic cells of various other sizes. When the size of the geographic cells partitioned from the geographic region is not as small as desired, geographic cell derivator 32 of FIG. 2 repeats the derivation process using vector street map information, jurisdictional areas and boundaries, hydrographic features, railways, and the like. Once the geographic cells are of the desired size, geographic cell derivator ceases the partitioning of the geographic region. Thus, in step 46 of the present invention, the size of the geographic cells formed after each geographic cell derivation process is analyzed to determine whether additional partitioning of the geographic region is required.

Figure 6:
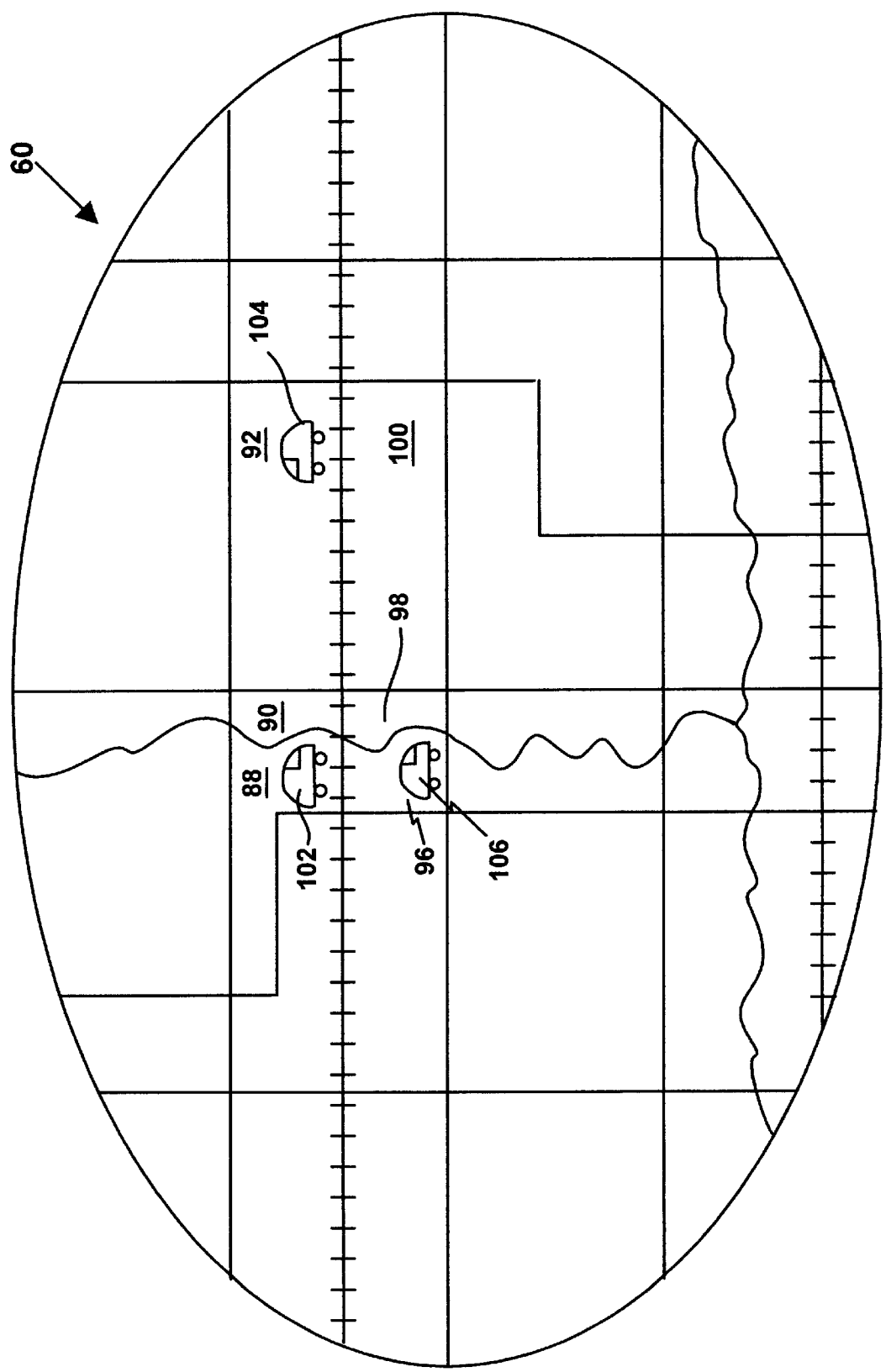
FIG. 6 is a schematic diagram of a geographic region partitioned into geographic cells by an automatic vehicle recommendation (AVR) system in accordance with the present claimed invention.

With reference next to step 48, AVL augmentor 34 of FIG. 2 supplements the AVL portion of CAD system 10 of FIG. 1 with the geographic cell information. More specifically, AVL augmentor 34 assigns a geographic cell identifier to each vehicle monitored by the AVL system. AVL augmentor 34 incorporates a geographic cell identifier into the standard latitude, longitude, elevation, time, speed, and heading information provided by the AVL portion of CAD system 10. Thus, the AVL portion of CAD system 10 also reports the geographic cell in which each monitored vehicle is located. Therefore, AVL augmentor 34 of the present invention functions as a server to the AVL system portion of CAD system FIG. 6 shows the partitioned geographic region 60 of FIG. 4D including geographic cells numbered 88, 90, 92, 96, 98, and 100. Although the present invention assigns a unique identifier to each of the geographic cells, only a few of the geographic cells are numbered in FIG. 6 for purposes of clarity. As shown in FIG. 6, vehicles 102, 104, and 106 are located in geographic cells 88, 92, and 96 respectively. AVL augmentor 34 of FIG. 2 supplements the AVL portion of CAD system 10 of FIG. 1, such that the AVL system reports the latitude, longitude, elevation, time, speed, and heading of vehicle 102 and also reports that vehicle 102 is located in geographic cell 88. Likewise, AVL augmentor 34 caused the AVL system to report in which of the previously partitioned geographic cells vehicles 104 and 106 are located. As the vehicles move into and out of different geographic cells, AVL augmentor 34 continues to supplement the AVL system with the current geographic cell identifier information for each of the monitored vehicles. The present invention is also well suited for use with station based or posted vehicles. In such a case, AVL augmentor 34 continues to supplement CAD system 10 with the geographic cell identifier corresponding to the location at which the vehicle is based or posted. If an AVL system is used to track the vehicle once it leaves the station or its posting location, AVL augmentor 34 supplements the AVL portion of CAD system 10 with the current geographic cell location of the monitored vehicle.

With reference next to step 50 of FIG. 3, the present invention compiles a geographic vehicle response time matrix. Vehicle response time matrix compiler 36 of FIG. 2, computes the time for a vehicle to travel from one geographic cell to another geographic cell. Although the present invention is well suited to computing the vehicle response time for the vehicle to travel from each geographic cell to every other geographic cell in a geographic region, the following description will discuss in detail only vehicle response times between geographic cells 88, 90, 92, 96, 98, and 100 of FIG. 6 for purposes of clarity.

With reference next to FIG. 7, a vehicle response time matrix formed according to one embodiment of the present invention is shown. In the present embodiment, the cost or time in minutes needed for the vehicle to travel to any given cell is represented in matrix format as shown in FIG. 7. The present invention is also well suited to compiling the vehicle response times in a format other than a matrix such as, for example, a list, a graph, and the like. Vehicle response time matrix compiler 36 computes the geographic cell to geographic cell vehicle response times in any one of several ways. A first approach computes a crow flies distance and then divides the crow flies distance by a selected vehicle travel rate. In the present embodiment, the selected vehicle travel rate is based upon average vehicle travel rates in the geographic region. However, the present invention is also well suited to selecting vehicle travel rates based upon the types of streets present in the geographic region, the types of vehicles being monitored, and various other factors. Although vehicle response time matrix compiler 36 is able to attain vehicle response times using the crow flies approach, such an approach is used primarily as a far field approximation. That is, the crow flies approach does not take into account the geographic attribute information of the geographic region. Therefore, in the present embodiment, the crow flies approach is invoked by vehicle response time matrix compiler 36 only to populate the vehicle response time matrix. More specifically, in the present embodiment, the crow flies approach is used only for computing vehicle response times between distant geographic cells. If a vehicle is located very distant from a specific geographic cell, that vehicle will probably not be considered as one of the vehicles which might respond to an emergency in that specific geographic cell. Therefore, a precise vehicle response time for the vehicle to travel to the distantly located geographic cell is rarely necessary in the present embodiment.

Another approach used by vehicle response time matrix compiler 36 uses transportation network and routing information for the geographic region. In such an approach, vehicle response time matrix compiler 36 considers factors such as posted speed limits, the number of intersections, and the like, along a known route from a geographic cell to another geographic cell. In so doing, vehicle response time matrix compiler 36 computes an accurate prediction of vehicle response travel times between geographic cells. By computing vehicle response times using transportation network and routing information, the present invention provides significant benefits to an operator of CAD system 10 of FIG. 1. As an example, although one vehicle may appear to be a more closely located to a reported event, vehicle response time matrix compiler 36 of the present invention can show that another more distantly located vehicle is actually able to respond more quickly to the reported event.

As yet another approach, vehicle response time matrix compiler 36 is also well suited to using operationally determined vehicle response times. In such an instance, vehicle response time matrix compiler 36 uses previously recorded reports of the time it took for a vehicle to travel from one geographic cell to another geographic cell. Such an approach is used when the present invention is employed with an existing CAD or AVL system which has been recording vehicle response times. Vehicle response time matrix compiler 36 is also well suited to using operationally determined vehicle response times to upgrade previous prediction of vehicle response travel times between geographic cells. That is, in the present embodiment, the present invention records actual vehicle response times. These operationally determined response times are used to replace estimated vehicle response times which appear inaccurate. In so doing, the present AVR system becomes more accurate the longer it is used. Thus, the present invention is a self-learning system whose accuracy improves with use.

The present invention is also well suited to using operationally determined response times to amend or reconstruct geographic cells. For example, if an operationally determined vehicle response time is much greater than a predicted response time, a significant vehicle impeding attribute may have been missed during the geographic cell derivation process. In such an instance, the present invention is well suited to amending the size or borders of one or more of the previously partitioned geographic cells. Thus, the accuracy of the present invention becomes even greater the longer it is used.

In the present embodiment, vehicle response time matrix compiler 36 only determines approximately 20 percent of all possible geographic cell to geographic cell combinations using transportation network and routing information, operationally determined vehicle response times, or combinations thereof. The rest of the possible geographic cell to geographic cell combinations are computed by vehicle response time matrix compiler 36 using crow flies computations. As stated above, if a vehicle is located very distant from a specific geographic cell, that vehicle will probably not be considered as one of the vehicles which might respond to an emergency in that specific geographic cell. Therefore, a precise vehicle response time for the vehicle to travel to the distantly located geographic cell is rarely necessary in the present embodiment. The present invention also determines intra-cell vehicle response times. Such times indicate the required time for a vehicle to move across a single geographic cell. In so doing, the present invention is able to show that a vehicle in the same geographic cell as the reported event may not be the vehicle which is able to respond most quickly to the event.

The present invention is also well suited to using operationally determined response times to determine whether vehicle response time matrix compiler 36 should construct an alternate matrix. For example, operationally determined vehicle response times may vary greatly under certain conditions such as, for example, inclement weather, rush hour traffic, and the like. If such variations occur, vehicle response time matrix compiler 36 is well suited to compiling at least a second vehicle response time matrix. The second vehicle response time matrix is employed in the AVR system of the present invention time when conditions warrant. In such an embodiment, the operator of CAD system 10 of FIG. 1 would select the matrix which corresponds to current conditions. Thus, the present invention is well suited to accurately compensating for vehicle rate altering conditions.

With reference next to step 52 of FIG. 3, the present invention compares the time required for the monitored vehicles to respond to a reported event. Comparator 38 of FIG. 2, compares the time for each of the monitored vehicles to travel from the respective geographic cell in which they are currently located to the geographic cell in which reported event occurred. Comparator 38 uses the vehicle response matrix compiled in step 50 to determine the predicted response time for each of the monitored vehicles. The present invention is well suited to limiting the comparison by comparator 38 to certain vehicles. For example, if the reported event is a medical emergency, a CAD system operator can select to only have ambulances considered by comparator 38 of the present AVR system.

With reference next to step 54 of FIG. 3, the present invention provides a recommendation of the fastest responding vehicles to the CAD system operator. In the present embodiment, vehicle recommendation generator 40 of FIG. 2, displays, on a graphic display of CAD system 10 of FIG. 1, which vehicle will be able to respond most quickly to the reported event. Although a single vehicle is recommended in the present embodiment. The present invention is also well suited to displaying a list of the available vehicles ranked from fastest responding vehicle to slowest responding vehicle. The present invention is also well suited to other vehicle recommending methods including but not limited to using voice synthesis logic to audibly recommend a vehicle, and the like. Furthermore, the present invention is also well suited to having a single AVR activator button located at CAD system 10. In so doing, an operator of CAD system 10 can activate the present invention simply, quickly, and without requiring a complex decision making process.

In summary the present invention is used in the following manner. Geographic cell derivator 32 of FIG. 2 divides a geographic region into a plurality of geographic cells. AVL augmentor 34 supplements an AVL portion of a CAD system with the a geographic cell identifier for each monitored vehicle. Cell response matrix compiler then calculates a response time for each of the plurality of vehicles to travel from each of the geographic cells to every other of the geographic cells. Once an event such as, for example, a medical emergency is reported to an operator of a CAD system, the CAD system operator activates the present AVR invention by, for example, pushing an "AVR" marked button. Comparator 38 then determines which of the plurality of monitored vehicles is able to respond most quickly to the geographic cell in which the reported event is located. Vehicle recommendation generator 40 then communicates to the CAD system which of the plurality of monitored vehicles is able to respond most quickly to the reported event.

Thus, the present invention provides a system which swiftly and automatically recommends which of a plurality of vehicles can respond most quickly to an event, a system which can function in conjunction with an existing AVL or CAD system, and a system which reduces CAD system operator decision making processes.

In another embodiment of the present invention, the cell derivation process described in step 44 of FIG. 3 is enhanced by creating an additional "target" cell for each of the locations from which vehicles are regularly dispatched. A high percentage of dispatches can occur from established and fixed locations, such as an ambulance posting location or a fire station. In this embodiment, geographic region 60 of FIG. 4D is further partitioned around those fixed locations.

Figure 8:
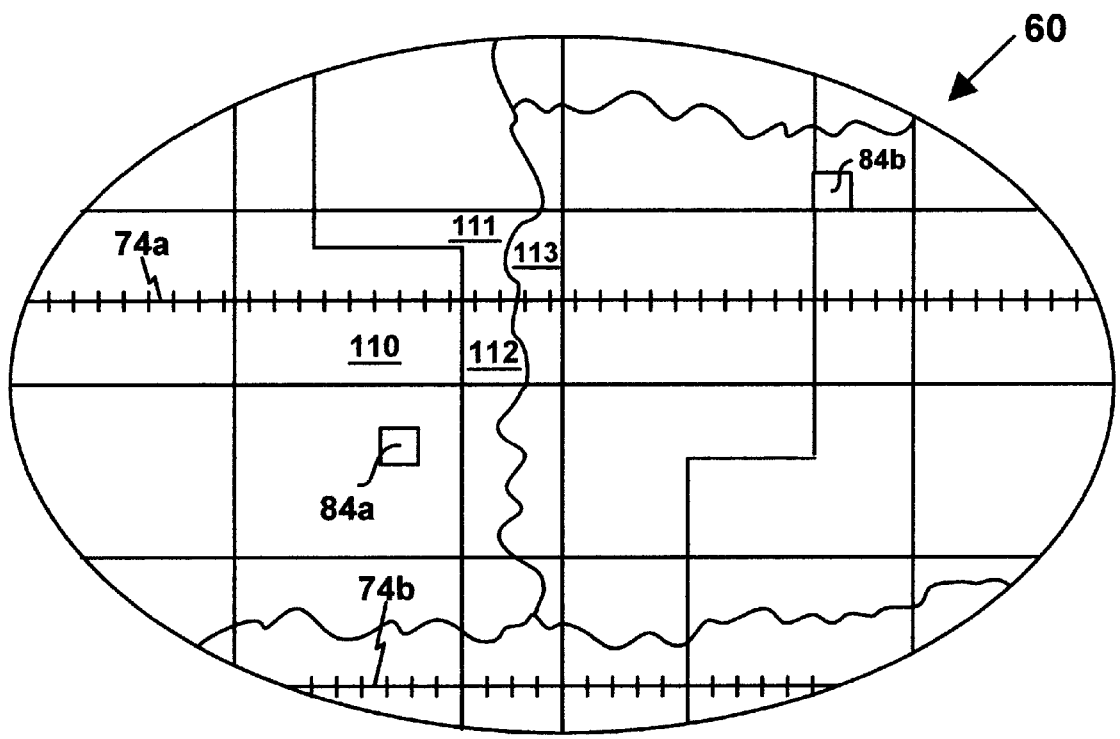
FIG. 8 is a schematic diagram illustrating a geographic cell derivation process employed by an automatic vehicle recommendation (AVR) system in accordance with the present claimed invention.

With reference now to FIG. 8, the cell derivation process as it is applied to locations from which vehicles are regularly dispatched is exemplified. As previously described herein, geographic cells are derived by partitioning geographic region 60 based on vendor street map information, hydrographic features, and the like. In this embodiment, additional "target" cells, typically referenced as 84 (84a and 84b), are derived with a fire station, ambulance posting location, or the like, at or near the center of each cell. The number of these fixed dispatch locations is small relative to the total number of other cells, so that in this embodiment an individual cell is partitioned around each such location. Such an enhanced cell derivation process is also readily applicable to partitioning the geographical region into "target" cells around locations to which dispatched vehicles are regularly sent. Such destinations would include places where large numbers of people are frequently present or where emergency services may be frequently required, such as an amusement park, a stadium, a shopping mall, a university, or the like.

The size of these cells is specified to be small enough that the vehicle response time within the cell is assumed to be constant. That is, the time for the vehicle to travel from its posting location, across and out of the cell 84a or 84b and into an adjacent cell is known and is not expected to change significantly as a function of time of day, weather conditions, and the like. In addition, the response time of the vehicle within that cell is well established even if the vehicle is not at its posting location; for example, even if the vehicle is located at one boundary of the cell, the time it will take for that vehicle to travel out of the cell is known more accurately in the present embodiment than in the prior art. Consequently, in this embodiment the accuracy of the vehicle response time matrix that is described by step 50 of FIG. 3 is increased. Therefore, the partitioning of the geographic region to include small cells around fire stations and other fixed dispatch locations, or around fixed dispatch destinations, is an effective means of enhancing the cell derivation process while also increasing the accuracy of the vehicle response time model.

This embodiment also incorporates a further enhancement of the model that is used to develop the vehicle response time matrix described by step 50 of FIG. 3. As described previously herein, the vehicle response time for each transition ("transition" is used herein to refer to travel from one cell to another cell) is determined using a model based either on a crow flies distance (as a far field approximation), or on network and routing information (for a more accurate prediction than the crow flies distance). In this embodiment, the network and routing information is enhanced so that the response time (i.e. the travel "cost" in terms of time) is determined based on the effective speed that the vehicle is predicted to be capable of achieving over different classifications of roads, considering also the types of intersections, as well as the number of intersections, that the vehicle encounters.

To determine the response time matrix in this embodiment, first the various possible and reasonable travel routes from one cell to another are identified based on the vector street map information. The time to travel each of these routes is then determined based on proper consideration of the effective speed that a vehicle can travel along the route, as follows. Each travel route from one point in the geographic region to another point is comprised of one or more different classifications of roads. The road classifications used are typified by those obtained from commonly available sources such as the Department of Transportation. Each travel route is thus divided into segments of varying length corresponding to the road classification. In this embodiment, the effective speed along each segment is determined based on the road classification for that segment. As an example, consider a travel route that includes a limited access highway with a posted speed limit of 55 miles per hour. The emergency vehicle will in actuality travel at a speed higher than the speed limit, so the effective speed along that segment of the travel route is greater than the posted speed limit. This embodiment of the present invention then utilizes the effective speed to calculate a realistic cost in time to travel that segment. In the same manner, the cost in time to travel each segment along a travel route is calculated, and the sum is used to establish the travel time for that particular travel route. This same process is applied to each of the possible and reasonable travel routes from one cell to another cell to determine the travel time associated with each route. These data are subsequently used with the intersection data described below to determine the best transition time for the two cells under consideration. The process is repeated for the other combinations of cells that are of interest. In this manner, a database of predicted vehicle response times is created for each transition that is evaluated.

The discussion above considers the cost in time as the parameter of interest for the AVR system. However, the present invention is well suited for applications other than those concerned with minimizing travel time. For example, a courier service would likely be more interested in minimizing the distances traveled by its delivery vehicles, or perhaps minimizing fuel consumption, and the like. Therefore, at the point in the process described above where the various and reasonable travel routes from one cell to another are identified, the cost in distance is then readily determined for each route. The optimum travel distances can then be compiled and used for an AVR system based on minimizing distance.

In this embodiment, the computation of the travel time along each travel route also includes the type as well as the number of intersections that are encountered. The intersections along each travel route are identified and categorized using the road classification information referred to previously herein (such as the information from the Department of Transportation). A typical travel route will intersect other roads that are either of an equivalent classification, a higher road classification (i.e., the road has more lanes, more cross traffic, etc.), or a lower road classification (i.e., the road has fewer lanes, less cross traffic, etc.). A vehicle responding to an emergency will proceed through each intersection as quickly as conditions safely permit. The vehicle will likely take more time to pass through a larger intersection than it would to pass through an intersection with a smaller road, due to the higher probability of significant cross traffic and other factors. Hence, there is a cost penalty in time that is incurred when the travel route intersects a road with a classification that is higher than the classification of that segment of the travel route. In this embodiment, the cost penalty is included in the calculation of the vehicle response time for each travel route. Accordingly, in this embodiment, the computation of the vehicle response time for each transition includes both the number and the type of intersections encountered along the traveled route.

Thus, this embodiment of the present invention increases the accuracy of the predictive model used to compile the vehicle response time matrix, by considering the effective speed that the vehicle can travel along the various segments of each route as well as the number and type of intersections encountered by the vehicle. The total times associated with each possible and reasonable cell to cell route are thus calculated and compiled. The best of these times is then entered into the appropriate block of the vehicle response time matrix compiler 36 of FIG. 2 as exemplified by FIG. 7.

As previously described herein, the vehicle response time matrix compiler 36 is well suited to incorporating operationally determined vehicle response times to augment the model's predictions of vehicle response times. That is, empirical data are obtained by measuring and recording actual vehicle travel times from the point where the vehicle is dispatched to its destination. The vehicle response time matrix exemplified by FIG. 7 will initially contain only theoretical data based on model predictions using the vehicle's effective speed, the effects of intersections with cross streets, and the like, as previously described herein. In this embodiment, the application of the empirical data is enhanced to improve the predictive model and, consequently, the vehicle response time matrix is also improved.

The empirical data are known to be accurate. The driver of the vehicle pushes a button when the vehicle begins to move in response to a dispatch, and also pushes a button upon arrival at the destination. The location of the vehicle when it begins its response is known, whether the vehicle is dispatched from a fixed location or tracked via an AVL system, and the destination is also known. The amount of empirical data will increase with time because data are collected for each dispatch. The empirical data are used to update the predictive model and, in turn, the vehicle response time matrix. The accuracy of the present invention therefore increases through use.

In this embodiment, the predictive model is modified to account for the empirical data using algorithms that provide a satisfactory fit to the combined theoretical and empirical data. In this manner, the present embodiment integrates the empirical data with the theoretical data to develop a more accurate predictive model. The predictive model in turn is then utilized to determine the vehicle response times that are input into the vehicle response time matrix exemplified by FIG. 7. Thus, in this embodiment the theoretical data are not directly replaced by the empirical data, and the theoretical data are not discarded. Instead, the predictive model and consequently the results determined by the model are modified and improved by incorporating the empirical data into algorithms used by the model.

As the amount of empirical data increases and as the data are incorporated into the model, the model's predictions will move closer and closer to matching the empirical data. Therefore, through integration of the empirical data with the theoretical data, the present embodiment becomes an accurate predictor of realistic vehicle response times.

Until enough time has passed to collect a significant amount of data, the amount of empirical data will be sparse relative to the amount of theoretical data. Also, the empirical data will remain sparse for an infrequently traveled route. Therefore, available data may not yet exist in a statistically meaningful amount for certain transitions. For those transitions where empirical data are sparse, the present embodiment is well suited to assimilating the available empirical data with the theoretical data.

For example, for transitions to distant cells, the empirical data is likely to be sparse or perhaps non-existent. Empirical data may also be sparse or nonexistent for transitions to a nearby cell if dispatches to that cell do not occur regularly. However, empirical data may exist for the transition to cells adjacent to or near the cell of interest. In this embodiment, the predictive model utilizes the empirical data from other applicable transitions, along with the theoretical data for the cell of interest, to provide an accurate estimate of the travel time to the cell of interest.

FIG. 8 provides an illustration of how the predictive model uses empirical data from one or more transitions to determine the travel time to a cell for which insufficient empirical data exists. In this example, the vehicle response times from cell 84a to cells 110, 111 and 113 are known based on empirical data and are also well predicted by the model, while only theoretical data exist for cell 112. In response to an emergency call, the AVR system is required to determine which of a plurality of vehicles, including the vehicle located in cell 84a, can respond most quickly to cell 112. In this embodiment, the predictive model is capable of utilizing the empirical data from cells 110, 111 and 113 in combination with the theoretical data for cell 112 to determine the time for the vehicle in cell 84a to travel to cell 112.

While in the above example the model was used to calculate the necessary information on-line in response to the emergency call, the present embodiment may also be utilized to make this calculation at any time. As such, in the present embodiment, when the vehicle response time matrix is initially developed based only on theoretical data, it is not necessary to determine a precise cost in time for every combination of cell to cell transition. For example, as previously discussed herein, a precise vehicle response time for a vehicle to travel to a distantly located cell is rarely necessary, as there will likely be another vehicle that will be able to respond in a shorter time. Therefore, some of the initial entries in the vehicle response time matrix typified by FIG. 7 are based on the crow flies distance, instead of using the enhanced network routing information previously described to make a more accurate prediction. As such, the vehicle response time matrix will have some initial entries that have a relatively high level of uncertainty. With reference back to FIG. 8, consider that the predicted vehicle response time matrix contains an entry for cell 112 that is initially based solely on the crow flies distance. As described above, the present embodiment utilizes the empirical data from cells 110, 111 and 113 to determine the time for the vehicle in cell 84 to travel to cell 112. Therefore, in this embodiment, it is not necessary to create a precise transition time for the cell of interest using the theoretical data; instead, the transition time based on the crow flies distance is adjusted to account for the new empirical data.

Similarly, in the present embodiment it is not necessary to use the theoretical data to create an initial entry in the vehicle response time matrix for every possible combination of cell to cell transition. For example, a model prediction may not be made for a particular transition between distant cells because the associated uncertainties may be significant enough that the prediction is not very meaningful, or because the vehicle response time matrix is so large that determining an entry for every possible transition is neither necessary or practical. Therefore, the vehicle response time matrix may initially contain some undefined (i.e., empty) entries. However, in the manner described above, in this embodiment the model is capable of using empirical data from applicable transitions to generate an entry in the vehicle response time matrix for those undefined entries. Therefore, in this embodiment, the predictive model has the capability to determine the vehicle response time for those transitions for which a prediction was not initially made. Thus, in this embodiment the predictive model can be utilized to complete the vehicle response time matrix using empirical data, and it is not necessary to complete the vehicle response time matrix prior to application of the present invention.

In a similar manner, the present embodiment is capable of providing a method to benchmark empirical data for a cell against empirical data for other cells. With reference again to FIG. 8, consider that empirical data may exist for the transition from cell 84 to cell 112, and that the empirical date are previously incorporated into the vehicle response time matrix but that no recent data exist. However, significant empirical data for the transitions from cell 84a to cells 110, 111 and 113 are recently obtained. In this embodiment, the model is utilized to validate the travel time contained in the vehicle response time matrix for the transition from cell 84 to cell 112 in the same manner as described above. That is, a transition time for cell 112 is determined using the empirical data for cells 110, 111 and 113. The newly calculated transition time for cell 112 is then compared to the previously recorded value. Based on the results of this comparison, the present embodiment is capable of determining a new transition time to cell 112, if required, by integrating the new data with the existing data.

By way of illustrating the above discussion, an example illustrating the incorporation of empirical data into the model is provided below.

Empirical Data Incorporation

In this embodiment, empirical data is used in combination with theoretical (modeled) data in order to produce a new cost table blended from each. Where empirical data are prevalent or well known, these data are weighted heavily relative to the theoretical model. For cost transitions where empirical data are sparse or nonexistent, the theoretical data are favored to fill transition costs. The relative weightings for each model are determined by:

the volume of empirical data for a given cell-to-cell transition;

the distribution of the empirical data (how much of the data is in agreement with itself).

The methods for applying such weightings to produce a derivative model are well known and include "weighted least-squares" and other such approximation techniques.

Theoretical Model

In this embodiment, where no empirical data exist for a transition, the theoretical model is used. However, the theoretical model utilizes a degree of smoothing such that a preponderance of empirical data in surrounding cells is taken into account. Consider the following table exemplifying travel costs derived from a theoretical model prior to empirical data being available.

| Cell | 1 | 2 | 3 | 4 | 5 |
|------|-----|-----|-----|-----|-----|
| 1 | 0 | 115 | 140 | 225 | 310 |
| 2 | 115 | 0 | 120 | 210 | 280 |
| 3 | 140 | 120 | 0 | 110 | 170 |
| 4 | 225 | 210 | 110 | 0 | 80 |
| 5 | 310 | 280 | 170 | 80 | 0 |

Dispatches Recorded Over Time

Continuing with this example, after some period of time, empirical data are available resulting from dispatches between cells. The following tables the number of dispatches over a period of one year.

| Cell | 1 | 2 | 3 | 4 | 5 |
|------|-----|-----|-----|-----|-----|
| 1 | 23 | 42 | 20 | 25 | 0 |
| 2 | 77 | 11 | 88 | 56 | 28 |
| 3 | 20 | 12 | 2 | 3 | 206 |
| 4 | 25 | 21 | 11 | 0 | 8 |
| 5 | 1 | 28 | 0 | 45 | 5 |

The typical dispatch times (derived from statistical norms) obtained from these empirical data are exemplified in the table below. In this example, a statistical norm is only available if three or more dispatches occurred between a cell pair. Note that dispatches within cells 3 and 4 and from cells 5 to 3 and 1 to 5 do not satisfy the required number of dispatches have no empirically derived cost.

| Cell | 1 | 2 | 3 | 4 | 5 |
|------|-----|-----|-----|-----|-----|
| 1 | 21 | 99 | 126 | 211 | — |
| 2 | 101 | 17 | 97 | 189 | 266 |
| 3 | 122 | 116 | — | 104 | 166 |
| 4 | 203 | 201 | 101 | — | 77 |
| 5 | — | 259 | — | 77 | 23 |

Updating the Travel Time Model

Continuing with the example, when the empirical data are combined with the theoretical model, using a weighted least-squares algorithm, a new travel time table is derived. This new cost matrix is shown in the table below. Note that the diagonal intra-cell values are now populated directly with empirical data. Cells where there were not enough empirical data (less than three dispatches) are heavily weighted toward the theoretical model. However, because the overall tendency of these empirical data was to reduce travel times, neighboring transitions with direct empirical data are reduced slightly as well.

| Cell | 1 | 2 | 3 | 4 | 5 |
|------|-----|-----|-----|-----|-----|
| 1 | 21 | 101 | 129 | 214 | 289 |
| 2 | 104 | 17 | 98 | 190 | 269 |
| 3 | 124 | 117 | 8 | 108 | 166 |
| 4 | 205 | 205 | 109 | 9 | 80 |
| 5 | 300 | 263 | 160 | 79 | 23 |

In this example, the new table above is used until additional empirical data are available to further refine the model.

In summary, the present embodiment utilizes an enhanced cell derivation process to partition cells around fixed locations from which vehicles are frequently dispatched, such as fire stations or ambulance posting locations, and optionally around destinations to which dispatched vehicles are frequently sent. These cells are specified to be small so that the accuracy of the vehicle response time matrix is increased. The accuracy of the vehicle response time matrix is also increased in the present embodiment by incorporating enhancements into the model for predicting the theoretical vehicle response times. These enhancements include the use of the vehicle's effective speed over different classifications of roads and consideration of the types of intersections as well as the number of intersections that the vehicle encounters en route from cell to cell. This embodiment also incorporates improvements regarding the integration of empirical data with the theoretical data to modify and improve the predictive model. In this embodiment, the empirical data are used with the improved predictive model to adjust the theoretical data to increase the accuracy of the vehicle response time matrix. The empirical data from a specific transition are used in the predictive model to modify the predicted vehicle response time for that transition, and also to modify the predicted response time for other applicable transitions for which there is insufficient empirical data. In addition, in this embodiment the empirical data and the predictive model are used to determine predicted response times for entries in the vehicle response matrix which were based on a crow flies approximation or which were undefined.

Thus, this embodiment of the present invention provides an AVR system which can accurately and automatically position vehicles within the monitored geographic region, is practical and economical, is able to predict with reasonable accuracy the response time for each of a plurality of vehicles for all potential dispatch destinations, and becomes more accurate through use.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system including a processor coupled to a bus, and a memory unit coupled to said bus for storing information, a computer-implemented method for indicating which of a plurality of vehicles to dispatch to a location within a geographic area comprising the steps of:
   a) dividing a geographic region into a plurality of geographic cells;
   b.) calculating a cost for a vehicle to travel from a first of said geographic cells to a second of said geographic cells by considering road classifications;
   c.) incorporating geographic cell information into an automatic vehicle location system such that position information for a plurality of vehicles monitored by said automatic vehicle location system further comprises an indication of said geographic cell in which said plurality of vehicles are respectively located;
   d) determining which of said plurality of vehicles is able most efficiently to be dispatched by a computer aided dispatch system to a location within one of said geographic cells; and
   e) communicating to said computer aided dispatch system which of said plurality of vehicles should be dispatched.

2. The computer implemented method as recited in claim 1 wherein said step of calculating a cost for a vehicle to travel from a first of said geographic cells to a second of said geographic cells by considering road classifications further comprises the step of:
   considering the type of roads on which said plurality of vehicles would travel when traveling between said first of said geographic cells to said second of said geographic cells.

3. The computer-implemented method as recited in claim 1 wherein said step of calculating a cost for a vehicle to travel from a first of said geographic cells to a second of said geographic cells by considering road classifications further comprises the step of:
   considering the number of intersections said plurality of vehicles would encounter when traveling between said first of said geographic cells to said second of said geographic cells.

4. The computer-implemented method as recited in claim 1 wherein said step of calculating a cost for a vehicle to travel from a first of said geographic cells to a second of said geographic cells by considering road classifications further comprises the step of:
   considering the type of intersections said plurality of vehicles would encounter when traveling between said first of said geographic cells to said second of said geographic cells.

5. The computer-implemented method as recited in claim 1 wherein said step of calculating a cost for a vehicle to travel from a first of said geographic cells to a second of said geographic cells by considering road classifications further comprises the step of:
   calculating a response time for a vehicle to travel from said first of said geographic cells to said second of said geographic cells.

6. The computer-implemented method as recited in claim 1 wherein said step of calculating a cost for a vehicle to travel from a first of said geographic cells to a second of said geographic cells by considering road classifications further comprises the step of:
   calculating the travel distance required for a vehicle to travel from said first of said geographic cells to said second of said geographic cells.

7. The computer-implemented method as recited in claim 1 wherein said step of calculating a cost for a vehicle to travel from a first of said geographic cells to a second of said geographic cells by considering road classifications further comprises the step of:
   calculating the fuel consumption required for a vehicle to travel from said first of said geographic cells to said second of said geographic cells.

8. In a computer system including a processor coupled to a bus, and a memory unit coupled to said bus for storing information, a computer-implemented method for indicating which of a plurality of vehicles to dispatch to a location within a geographic area comprising the steps of:
   a) dividing a geographic region into a plurality of geographic cells;
   b) calculating a cost for a vehicle to travel from a first of said geographic cells to a second of said geographic cells;
   c) developing a list indicating said calculated cost for said vehicle to travel from said first of said geographic cells to said second of said geographic cells;
   d) recording empirical data for said vehicle to travel from said first of said geographic cells to said second of said geographic cells
   e) comparing empirical cost data for said vehicle to travel from said first of said geographic cells to a second of said geographic cells with said cost calculated in step b); and
   f) altering said list of step c) using said empirical data such that the accuracy of said list is improved.

9. The computer-implemented method as recited in claim 8 wherein said step of altering said list further comprises the step of:
   replacing said calculated cost with said empirical cost data.

10. The computer-implemented method as recited in claim 8 wherein said step of altering said list further comprises the step of:
   merging said calculated cost with said empirical cost data.

11. The computer-implemented method as recited in claim 8 further comprising the step of:
   g) using said empirical data to estimate cost data for said vehicle to travel from said first of said geographic cells to a third of said geographic cells.

12. A system for indicating the fastest responding vehicle within a geographic area comprising:

an automatic vehicle location system for tracking vehicles within a geographic area;

a computer aided dispatch system coupled to said automatic vehicle location system; and an automatic vehicle recommendation system coupled to said computer aided dispatch system and said automatic vehicle location system, said automatic vehicle recommendation system for communicating to said computer aided dispatch system which of said vehicles is able to respond in the shortest time to an event reported to said computer aided dispatch system, said automatic vehicle recommendation system further comprising:

a cell database comprising a plurality of geographic cells subdivided from said geographic area, said plurality of geographic cells including a target cell, and a vehicle response time matrix comprising response times for said vehicles to travel from one of said geographic cells to another of said geographic cells.

13. The system of claim 12 further wherein said target cell is a small-sized cell particularly defining a location to which a vehicle is expected to be dispatched.

14. The system of claim 13 further wherein said location to which a vehicle is expected to be dispatched is selected from the group consisting of an amusement park, a shopping mall, a stadium, and a university.

15. The system of claim 12 further wherein said target cell is a small-sized cell particularly defining a location from which a vehicle is expected to be dispatched.

16. The system of claim 15 further wherein said location from which a vehicle is expected to be dispatched is an ambulance posting station.

17. The system of claim 15 further wherein said location from which a vehicle is expected to be dispatched is a fire station.

* * * * *